(12) United States Patent
Yoon et al.

(10) Patent No.: US 12,538,410 B2
(45) Date of Patent: Jan. 27, 2026

(54) ELECTRONIC DEVICE INCLUDING HEAT PIPE SURROUNDING MULTIPLE INTEGRATED CIRCUITS

(71) Applicant: Samsung Electronics Co., Ltd., Suwon-si (KR)

(72) Inventors: Youngho Yoon, Suwon-si (KR); Sangchul Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 306 days.

(21) Appl. No.: 18/323,880

(22) Filed: May 25, 2023

(65) Prior Publication Data

US 2024/0074028 A1 Feb. 29, 2024

Related U.S. Application Data

(63) Continuation of application No. PCT/KR2023/006226, filed on May 8, 2023.

(30) Foreign Application Priority Data

Aug. 29, 2022 (KR) .......................... 10-2022-0108736
Oct. 13, 2022 (KR) .......................... 10-2022-0131432

(51) Int. Cl.
*H05K 1/02* (2006.01)
*H01L 23/367* (2006.01)
(Continued)

(52) U.S. Cl.
CPC ....... *H05K 1/0203* (2013.01); *H01L 23/3677* (2013.01); *H01L 23/427* (2013.01);
(Continued)

(58) Field of Classification Search
CPC . G06F 1/163; G06F 1/206; G06F 1/20; G06F 1/203; G06F 2200/201;
(Continued)

(56) References Cited

U.S. PATENT DOCUMENTS 6,104,611 A * 8/2000 Glover ................ F28D 15/0275
165/104.33
6,164,368 A 12/2000 Furukawa et al.
(Continued)

FOREIGN PATENT DOCUMENTS

CN 213241061 U 5/2021
CN 213816133 U 7/2021
(Continued)

OTHER PUBLICATIONS

International Search Report with Written Opinion and English translation dated Aug. 23, 2023; International Appln. No. PCT/KR2023/006226.

(Continued)

*Primary Examiner* — Michael A Matey
(74) *Attorney, Agent, or Firm* — Jefferson IP Law, LLP

(57) ABSTRACT

An electronic device is provided. The electronic device includes a printed circuit board (PCB) comprising a first surface and a second surface opposite to the first surface. The electronic device includes a processor on the second surface. The electronic device includes a heat sink on the second surface, partially contacted on the processor. The electronic device includes a first integrated circuit (IC) on the first surface. The electronic device includes a second IC on the first surface spaced apart from the first IC. The electronic device includes a heat pipe including a first portion surrounding the first IC and the second IC when viewing the first surface in a second direction opposite to a first direction that the first surface faces, and a second portion extended from the first portion to the heat sink.

20 Claims, 10 Drawing Sheets

(51) Int. Cl.
  *H01L 23/427* (2006.01)
  *H01L 23/467* (2006.01)
  *H05K 7/20* (2006.01)
  *G06F 1/16* (2006.01)
  *G06F 1/20* (2006.01)

(52) U.S. Cl.
  CPC ....... *H01L 23/467* (2013.01); *H05K 7/20145* (2013.01); *H05K 7/20209* (2013.01); *G06F 1/163* (2013.01); *G06F 1/203* (2013.01)

(58) Field of Classification Search
  CPC .................. G06F 1/184; G02B 27/017; G02B 2027/0178; G02B 7/02; G02B 2027/014; H05K 1/0203; H05K 7/20145; H05K 7/20209; H05K 7/20336; H05K 7/2039; H05K 7/20963; H05K 7/20154; H05K 2201/10159; H05K 2201/066; H05K 2201/042; H05K 1/18; H05K 1/0201; H05K 1/144; H05K 5/0069; H01L 23/3677; H01L 23/467; H01L 23/427; H01L 2023/4062; H01L 23/36; H01L 23/367; H01L 23/3672; H01L 23/373; F28D 15/0241; F28D 2021/0029; F28D 15/02; F28D 15/0275; F28D 15/00; F28D 15/04; F28F 2255/02; F28F 21/00; F28F 3/12
  See application file for complete search history.

(56) References Cited

U.S. PATENT DOCUMENTS

| | | | | |
|---|---|---|---|---|
| 6,525,934 B1* | 2/2003 | Nakanishi | ............... | H01L 23/38 174/16.3 |
| 7,019,974 B2* | 3/2006 | Lee | ............... | G06F 1/20 174/15.2 |
| 7,325,590 B2* | 2/2008 | Kim | ............... | G06F 1/203 165/122 |
| 7,697,288 B2* | 4/2010 | Okutsu | ............... | G06F 1/203 174/15.2 |
| 8,395,898 B1* | 3/2013 | Chamseddine | ....... | F28D 7/0075 361/695 |
| 8,553,415 B2 | 10/2013 | Wang et al. | | |
| 9,142,476 B2 | 9/2015 | Shioga et al. | | |
| 9,585,285 B2* | 2/2017 | Nikkhoo | ............... | F28F 3/08 |
| 9,839,166 B2 | 12/2017 | Kim et al. | | |
| 10,405,467 B2* | 9/2019 | McGinty | ............... | G06F 1/1656 |
| 10,416,735 B2 | 9/2019 | Ali | | |
| 10,433,467 B2* | 10/2019 | Hurbi | ............... | G02B 7/002 |
| 10,551,886 B1 | 2/2020 | De La Fuente | .... | H05K 7/20963 |
| 10,579,114 B1* | 3/2020 | Mills | ............... | G06F 1/203 |
| 11,029,730 B2 | 6/2021 | Allin et al. | | |
| 11,076,510 B2 | 7/2021 | Stellman | | |
| 11,249,514 B2 | 2/2022 | Kuo et al. | | |
| 11,487,115 B2 | 11/2022 | Misawa et al. | | |
| 11,513,573 B2* | 11/2022 | Choi | ............... | G02B 27/0172 |
| 11,698,536 B2* | 7/2023 | Pope | ............... | G06F 1/206 361/679.47 |
| 11,703,923 B2* | 7/2023 | Mou | ............... | G06F 1/203 361/679.46 |
| 11,991,859 B2* | 5/2024 | Wu | ............... | H05K 7/20336 |
| 12,029,014 B2* | 7/2024 | Yoon | ............... | G06F 1/20 |
| 12,117,618 B2* | 10/2024 | Homma | ............... | G02B 7/008 |
| 2002/0008963 A1* | 1/2002 | DiBene, II | ............. | H05K 3/368 361/720 |
| 2003/0189815 A1* | 10/2003 | Lee | ............... | F28D 15/0275 361/679.52 |
| 2007/0295014 A1 | 12/2007 | Martin et al. | | |
| 2009/0021908 A1* | 1/2009 | Patel | ............... | G06F 1/20 361/688 |
| 2009/0040725 A1* | 2/2009 | Peng | ............... | H01L 23/4006 361/709 |
| 2009/0129020 A1* | 5/2009 | Fujiwara | ............... | G06F 1/203 361/697 |
| 2011/0179806 A1* | 7/2011 | Ipposhi | ............... | F28D 15/0266 62/3.3 |
| 2014/0182817 A1* | 7/2014 | Yu | ............... | F28D 15/0275 165/104.21 |
| 2015/0043167 A1* | 2/2015 | Guenin | ............... | H01L 23/427 361/719 |
| 2015/0342023 A1* | 11/2015 | Refai-Ahmed | .... | H05K 7/20154 29/829 |
| 2015/0342089 A1* | 11/2015 | Kim | ............... | H05K 7/20336 361/700 |
| 2016/0209659 A1* | 7/2016 | Nikkhoo | ............... | G02C 5/18 |
| 2016/0255748 A1* | 9/2016 | Kim | ............... | G02B 27/0006 361/695 |
| 2017/0184863 A1* | 6/2017 | Balachandreswaran | ............... | G02B 27/0176 |
| 2018/0307282 A1* | 10/2018 | Allin | ............... | G06F 1/20 |
| 2018/0348812 A1* | 12/2018 | Miller | ............... | G06F 1/1686 |
| 2019/0107870 A1* | 4/2019 | Ali | ............... | G06F 1/203 |
| 2019/0191589 A1 | 6/2019 | Fitch | | |
| 2020/0089292 A1* | 3/2020 | North | ............... | G06F 1/206 |
| 2020/0225492 A1* | 7/2020 | Williams | ........... | G02B 27/0176 |
| 2021/0015007 A1* | 1/2021 | Watanabe | ............... | G06F 1/203 |
| 2022/0113092 A1* | 4/2022 | Ku | ............... | F28D 15/04 |
| 2022/0163809 A1* | 5/2022 | Lee | ............... | G02B 27/0176 |
| 2023/0030748 A1* | 2/2023 | Pope | ............... | G06F 3/011 |
| 2023/0156900 A1* | 5/2023 | Cavallaro | ............... | G06F 1/203 361/679.54 |

FOREIGN PATENT DOCUMENTS

| | | |
|---|---|---|
| CN | 214335673 U | 10/2021 |
| KR | 10-1429761 B1 | 8/2014 |
| KR | 10-2016-0105228 A | 9/2016 |
| KR | 10-2020-0002997 A | 1/2020 |
| KR | 10-2179343 B1 | 11/2020 |
| KR | 10-2022-0035803 A | 3/2022 |
| WO | 1999/006782 A1 | 2/1999 |

OTHER PUBLICATIONS

European Search Report dated Oct. 7, 2025, issued in European Application No. 23860589.3.

\* cited by examiner

ELECTRONIC DEVICE INCLUDING HEAT PIPE SURROUNDING MULTIPLE INTEGRATED CIRCUITS

CROSS-REFERENCE TO RELATED APPLICATION(S)

This application is a continuation application, claiming priority under § 365(c), of an International application No. PCT/KR2023/006226, filed on May 8, 2023, which is based on and claims the benefit of a Korean patent application number 10-2022-0108736, filed on Aug. 29, 2022, in the Korean Intellectual Property Office, and of a Korean patent application number 10-2022-0131432, filed on Oct. 13, 2022, in the Korean Intellectual Property Office, the disclosure of each of which is incorporated by reference herein in its entirety.

TECHNICAL FIELD

The disclosure relates to an electronic device including a heat pipe surrounding multiple integrated circuits (ICs).

BACKGROUND ART

An electronic device may include a plurality of components. While a service is provided through the electronic device, a part of the plurality of components may have a higher temperature than other parts of the plurality of components. For example, the electronic device may include a radiating structure to reduce the temperature of the part of the plurality of components.

The above information is presented as background information only to assist with an understanding of the disclosure. No determination has been made, and no assertion is made, as to whether any of the above might be applicable as prior art with regard to the disclosure.

DISCLOSURE

Technical Solution

An electronic device is provided. The electronic device may comprise a printed circuit board (PCB) comprising a first surface and a second surface opposite to the first surface. The electronic device may comprise a processor on the second surface. The electronic device may comprise a heat sink on the second surface, partially contacted on the processor. The electronic device may comprise a first integrated circuit (IC) on the first surface. The electronic device may comprise a second IC on the first surface spaced apart from the first IC. The electronic device may comprise a heat pipe including a first portion on the first surface, respectively connected to the first IC and the second IC, surrounding the first IC and the second IC when viewing the first surface in a second direction opposite to a first direction that the first surface faces, and a second portion extended from the first portion to the heat sink.

DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
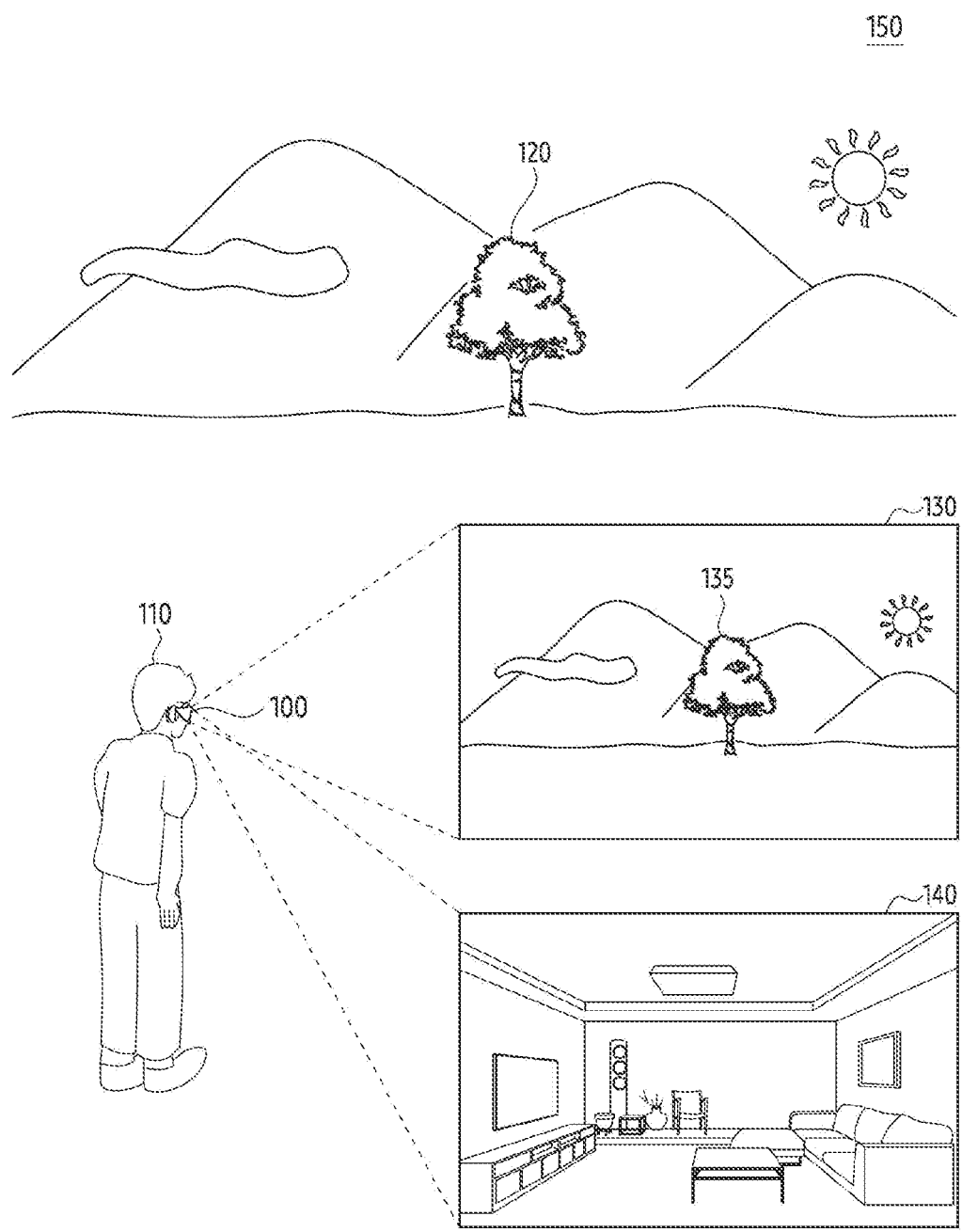
FIG. 1 illustrates an environment including an exemplary electronic device.

FIG. 1 illustrates an environment including an exemplary electronic device.

Referring to FIG. 1, an environment 150 may include an electronic device 100. For example, the electronic devices 100 may be used to provide virtual reality, augmented reality, mixed reality, extended reality, or substitutional reality. For example, the electronic device 100 worn on a part of the body (e.g., head) of a user 110 may be a means or interface for applying the activity of the user 110 in the environment 150 to the virtual environment provided through the electronic device 100 or the environment 150 shown through the electronic device 100. For example, the electronic device 100 may display an image 130 corresponding to the environment 150 shown through the electronic device 100 through the display of the electronic device 100. For example, the image 130 may include a visual object 135 corresponding to a real object 120 in the environment 150.

For example, the image 130 may be obtained through a camera of the electronic device 100. For example, the electronic device 100 may display an image 140 for the virtual environment, which is distinguished from the environment 150 and obtained through the processor of the electronic device 100. The electronic device 100 wearable on the part of the body of the user 110 may be illustrated through FIGS. 2A and 2B.

Figure 2A:
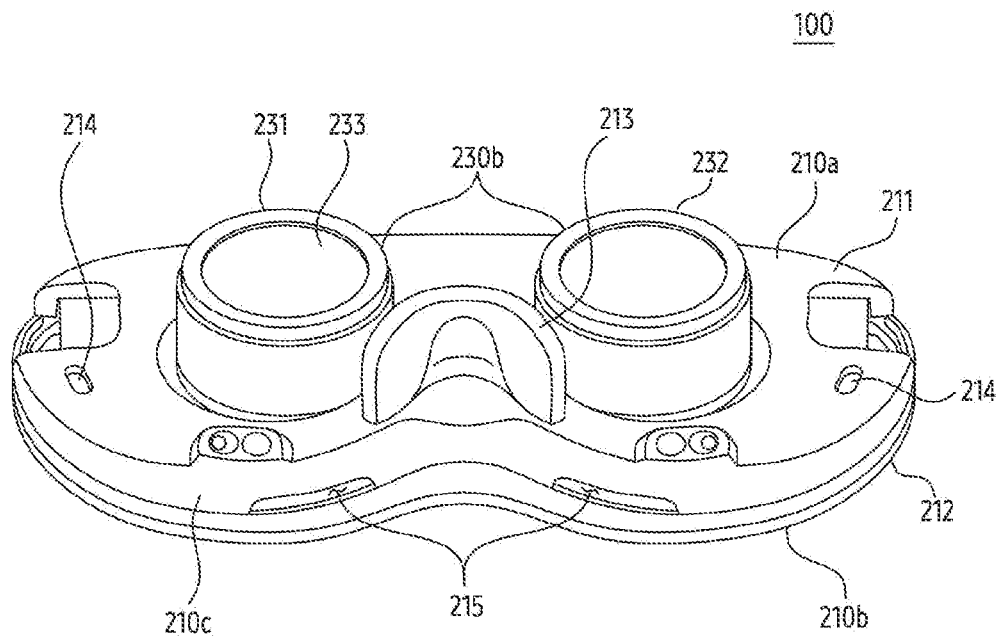
FIG. 2A is a perspective view of an exemplary electronic device.

FIG. 2A is a perspective view of an exemplary electronic device.

Figure 2B:
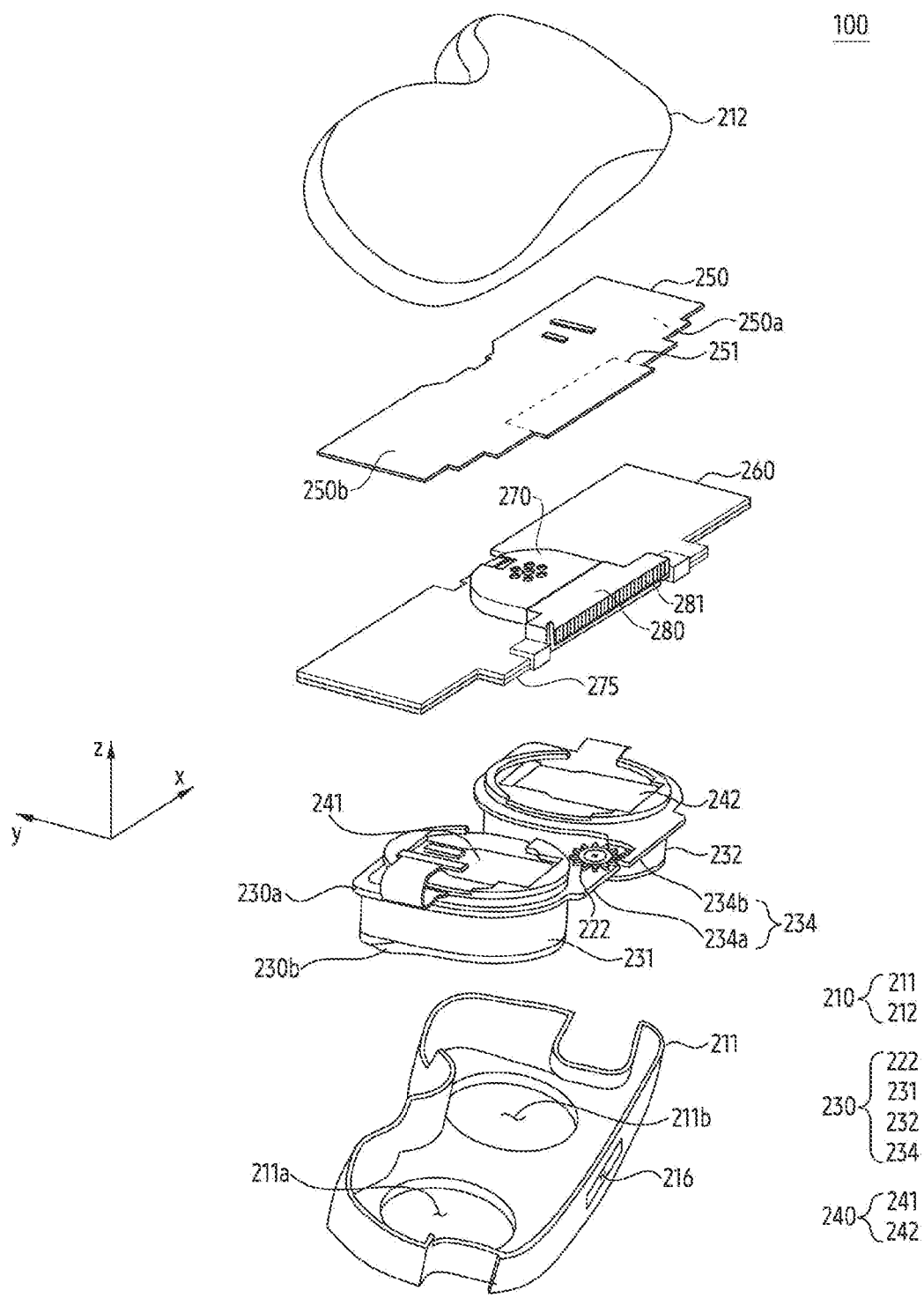
FIG. 2B is an exploded perspective view of an exemplary electronic device.

FIG. 2B is an exploded perspective view of an exemplary electronic device.

Referring to FIGS. 2A and 2B, the electronic device 100 may include a housing 210, a case 230 (or a lens barrel 230) arranged with respect to the housing 210, at least one display 240 arranged with respect to the case 230, a printed circuit board (PCB) 250, and/or a bracket 260 arranged with respect to the PCB 250.

The housing 210 may form or define at least a portion of the outer surface of the electronic device 100. For example, the housing 210 may include various components of the electronic device 100.

For example, the housing 210 may include a first surface 210*a*, a second surface 210*b*, and a third surface 210*c* between the first surface 210*a* and the second surface 210*b*. For example, the first surface 210*a* may face the part of the body when the electronic device 100 is worn. For example, the second surface 210*b* opposite to the first surface 210*a* may be spaced apart from the first surface 210*a*. For example, a direction in which the second surface 210*b* faces (e.g., the +z direction) may be opposite to the direction in which the first surface 210*a* faces (e.g., the −z direction). For example, the direction in which the second surface 210*b* faces may correspond to a direction of the user 110's gaze when the electronic device 100 is worn. For example, the third surface 210*c* may extend from the first surface 210*a* to the second surface 210*b*.

For example, the housing 210 may include a first case 211 and a second case 212. For example, the first case 211 may define or form the first surface 210*a*. For example, the first case 211 may include a first hole 211*a* and a second hole 211*b* spaced apart from the first hole 211*a*. For example, the first hole 211*a* and the second hole 211*b* may be components for the case 230. For example, the second case 212 may define or form the second surface 210*b*. For example, the third surface 210*c* may be formed or defined by coupling between the first case 211 and the second case 212.

For example, the housing 210 may include a nose pad 213. For example, the nose pad 213 may be in contact with a part of the body (e.g., a nose of the user 110) when the electronic device 100 is worn. For example, the nose pad 213 may support the electronic device 100 contacted on the portion of the body.

For example, the housing 210 may include at least one first inlet 214, at least one second inlet 215, and at least one outlet 216. For example, air from outside of the electronic device 100 may flow into inside of the electronic device 100 through the first inlet 214 and the second inlet 215. For example, the air from the inside of the electronic device 100 may flow out of the electronic device 100 through the outlet 216. For example, the air flowed through the first inlet 214 and the second inlet 215 may flow out through the outlet 216. An example of a path of the air will be described later in FIG. 5.

The case 230 may be movably connected to the housing 210. For example, a part 230*a* of the case 230 may be disposed in the housing 210. For example, a part 230*a* of the case 230 may be connected to the display 240. For example, another part 230*b* of the case 230 may be exposed outside the housing 210. For example, the other part 230*b* of the case 230 may protrude. For example, the other part 230*b* of the case 230 may protrude through the first hole 211*a* and the second hole 211*b*.

For example, the case 230 may include a first flange 231 and a second flange 232. For example, the first flange 231 may be at least partially surrounded by the first hole 211*a*. For example, the second flange 232 may be at least partially surrounded by the second hole 211*b*.

For example, the case 230 may include a lens 233. For example, the lens 233 may be used to refract light emitted from at least one display 240 to be illustrated below. For example, the lens 233 may be connected to the other part 230*b* of the case 230. For example, the lens 233 may face a part of the user's body (e.g., eyes) when the electronic device 100 is worn. For example, the lens 233 may be included in each of the first flange 231 and the second flange 232.

For example, the case 230 may include a pinion gear 222 including a plurality of teeth and a rack gear 234 including a plurality of teeth. For example, the rack gear 234 may be interlocked with the pinion gear 222. For example, the rack gear 234 may be disposed in the part 230*a* of the case 230. For example, the rack gear 234 may include a first rack gear 234*a* and a second rack gear 234*b*. For example, the first rack gear 234*a* may be connected with the first flange 231. For example, the second rack gear 234*b* may be connected with the second flange 232.

At least one display 240 may be used to display an image. For example, the at least one display 240 may be connected with the PCB 250 through a flexible printed circuit board (FPCB) (not shown). For example, the at least one display 240 may include a first display 241 and a second display 242. For example, the first display 241 may be fastened to the first flange 231 or disposed within the first flange 231. For example, the second display 242 may be fastened to the second flange 232 or disposed within the second flange 232. For example, the first display 241 and the second display 242 may be movable. For example, a distance between the first display 241 and the second display 242 may be changed according to the movement of the rack gear 234 interlocked to the pinion gear 222. For example, the distance between the first display 241 and the second display 242 may be set to a distance corresponding to an inter-pupillary distance of the user through the pinion gear 222 and the rack gear 234.

The PCB 250 may include a first surface 250*a* facing the bracket 260 and a second surface 250*b* opposite to the first surface 250*a*. For example, at least a part of the first surface 250*a* and at least a part of the second surface 250*b* may be in contact with at least a part of the bracket 260. For example, the second surface 250*b* may include an area 251 facing a heat sink 280 in the bracket 260 to be illustrated below. For example, the area 251 of the second surface 250*b* may include a processor and a memory. However, it is not limited thereto.

For example, the PCB 250 may include a plurality of circuits (not shown in FIGS. 2A and 2B) for functions executable within the electronic device 100. For example, the plurality of circuits may include a plurality of heat sources. For example, temperature of each of the plurality of heat sources may rise above a certain temperature while at least a part of the functions are executed. For example, the plurality of heat sources may include a plurality of integrated circuits (ICs) to be illustrated below. For example, the plurality of heat sources may include the processor and the memory. An example of the plurality of heat sources will be described in detail below.

The bracket 260 may include a heat dissipation structure for reducing temperature of the plurality of heat sources. For example, the heat dissipation structure may include the fan 270, a heat pipe 275 and the heat sink 280 connected to the heat pipe 275 and including a plurality of pins 281. For example, the heat dissipation structure including the fan 270, the heat pipe 275, and the heat sink 280 may be arranged with respect to the PCB 250. The relative positional relationship between each of the plurality of circuits in the PCB 250 and the fan 270, the relative positional relationship between each of the plurality of circuits in the PCB 250 and the heat pipe 275, and the relative positional relationship between each of the plurality of circuits in the PCB 250 and the heat sink 280 may be illustrated through the description of FIG. 3.

Figure 3:
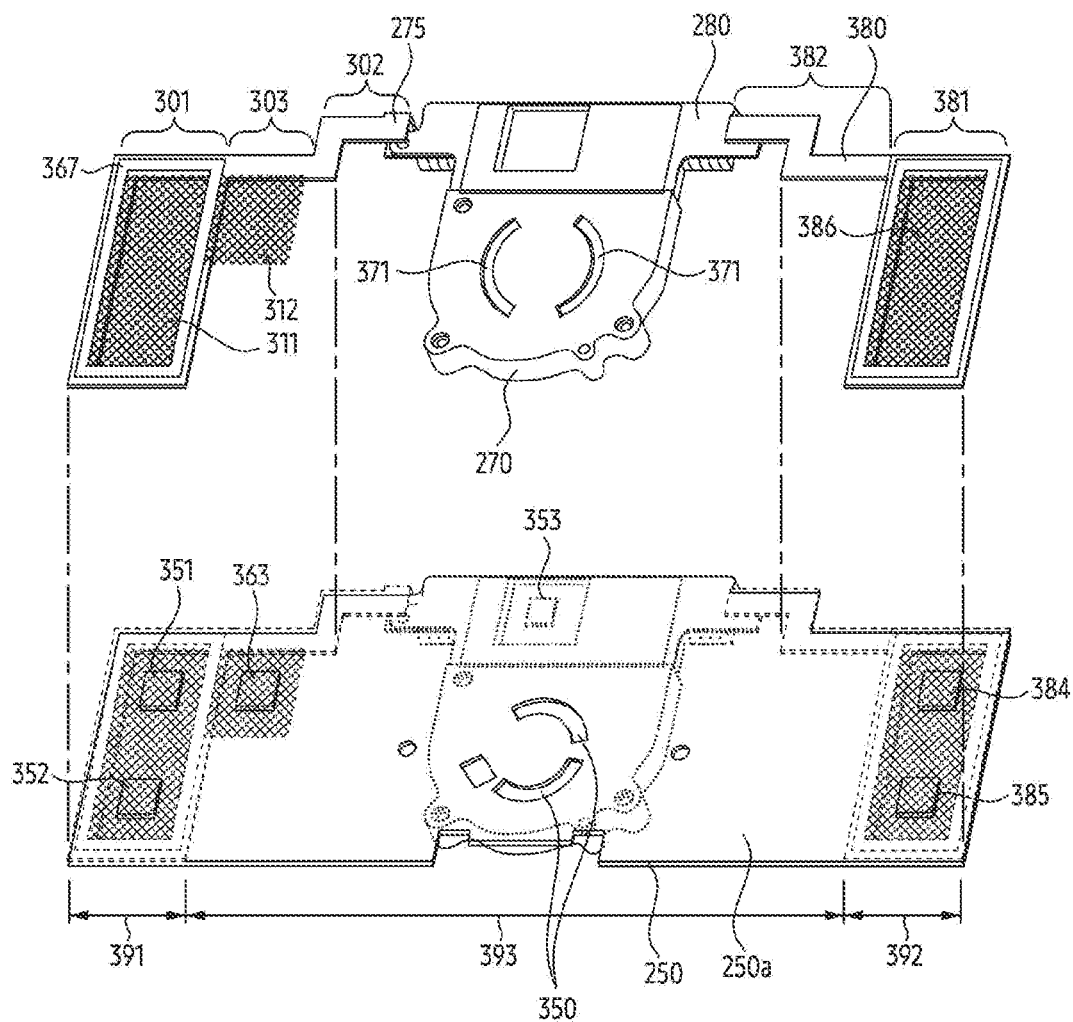
FIG. 3 illustrates an example of a relative positional relationship between each of ICs on a first surface of a printed circuit board (PCB) and a heat pipe.

FIG. 3 illustrates an example of a relative positional relationship between each of ICs on a first surface of a printed circuit board (PCB) and a heat pipe.

Referring to FIG. 3, a first IC 351 of the plurality of ICs may be located on the first surface 250a of the PCB 250. For example, the first IC 351 may be included in the electronic device 100 for power provided to at least one display 240 located in front of eyes of a user when the electronic device 100 is worn by the user. However, it is not limited thereto.

For example, a second IC 352 of the plurality of ICs may be located on the first surface 250a of the PCB 250. For example, the second IC 352 may be spaced apart from the first IC 351. For example, the second IC 352 may be included in the electronic device 100 to charge a rechargeable battery in the electronic device 100. For example, the second IC 352 may be included in the electronic device 100 to control emitting elements included in the at least one display 240. However, it is not limited thereto.

For example, a processor 353 (e.g., a processor 920 of FIG. 9) may be located on the second surface 250b of the PCB 250. For example, the heat sink 280 may be connected with the processor 353 to transfer heat from the processor 353. For example, the heat sink 280 may be at least partially located on the processor 353. For example, the heat sink 280 may be partially contacted on the processor 353. For example, the heat sink 280 may be located on the second surface 250b of the PCB 250. For example, another part of the heat sink 280 that is different from a part of the heat sink 280 in contact with the processor 353 may be located on the second surface 250b of the PCB 250.

FIG. 3 illustrates an example in which the processor 353 is disposed or contacted on the second surface 250b, but this is for convenience of explanation. The processor 353 may be contacted on the first surface 250a. When the processor 353 is contacted on the first surface 250a, the heat sink 280 may be partially contacted on the processor 353 and may be contacted on the first surface 250a. However, it is not limited thereto.

For example, the heat pipe 275 may include a first portion 301 and a second portion 302. For example, the heat pipe 275 may further include a third portion 303.

For example, the heat pipe 275 may include the first portion 301 on the first surface 250a surrounding the first IC 351 and the second IC 352 when viewing the first surface 250a in a second direction (e.g., −z axis direction) opposite to a first direction that the first surface 250a faces. For example, the first portion 301 may form a closed loop.

For example, the first portion 301 may be connected to each of the first IC 351 and the second IC 352. For example, unlike the illustration of FIG. 3, the first portion 301 is connected to each of the first IC 351 and the second IC 352 may include that the first portion 301 is directly connected to each of the first IC 351 and the second IC 352. For example, the connection between the first portion 301 and each of the first IC 351 and the second IC 352 may include indirect connection between the first portion 301 and each of the first IC 351 and the second IC 352 through another component (e.g., heat transfer members). For example, as shown in FIG. 3, the connection between the first portion 301 and each of the first IC 351 and the second IC 352 may a connection between the first portion 301 and each of the first IC 351 and the second IC 352 through the mesh plate 311 to be illustrated below. However, it is not limited thereto. For example, when the mesh plate 311 is not included in the electronic device 100, each of the first IC 351 and the second IC 352 may be directly connected to the first portion 301 or may be connected through another member replacing the mesh plate 311.

For example, since the first portion 301 forms a closed loop, the first portion 301 may provide a diversity of paths through which heat from each of the first IC 351 and the second IC 352 respectively connected to the first portion 301 is transferred. For example, since the first portion 301 forms a closed loop, heat from each of the first IC 351 and the second IC 352 may be transferred not only along a path to the heat sink 280, but also along another path distinguished from the path to the heat sink 280. For example, the heat from each of the first IC 351 and the second IC 352 may be dispersed through the first portion 301.

For example, the heat pipe 275 may include the second portion 302 extending from the first portion 301 to the heat sink 280. For example, a part of the second portion 302 may be located on the first surface 250a, and another part of the second portion 302 may be located on the second surface 250b. However, it is not limited thereto.

FIG. 3 illustrates an example of extending from the first portion 301 to the second portion 302 through the third portion 303 to be illustrated below, but this is for convenience of explanation. For example, when the third IC 363 on the first surface 250a is not included in the electronic device 100, the first portion 301 may be directly connected to the second portion 302. For example, the first portion 301 may be connected to the heat sink 280 through the second portion 302. However, it is not limited thereto.

For example, the mesh plate 311 may be connected to the first portion 301. For example, the mesh plate 311 may be connected to the first portion 301 through a support member 367. For example, the support member 367 may surround the mesh plate 311 when viewing the mesh plate 311 in the z-axis direction. However, it is not limited thereto.

For example, the mesh plate 311 may be contacted on the first IC 351 spaced apart from the first portion 301. For example, a part of the mesh plate 311 may be contacted on the first IC 351. For example, the first IC 351 spaced apart from the first portion 301 may be connected to the first portion 301 through the mesh plate 311.

For example, the mesh plate 311 may be contacted on the second IC 352 spaced apart from the first portion 301. For example, a part of the mesh plate 311 may be contacted on the second IC 352. For example, the second IC 352 spaced apart from the first portion 301 may be connected to the first portion 301 through the mesh plate 311.

For example, when a blade (not shown in FIG. 3) of the fan 270 on the second surface 250b rotates, the mesh plate 311 contacted on the first IC 351 and the second IC 352 may be located on or within a path of air to an inlet 371 of the fan 270. For example, unlike the illustration of FIG. 3, the fan 270 may be located on the first surface 250a. For example, the air may flow into inside of the inlet 371 from the outside of the electronic device 100 through the first inlet 214 and/or the second inlet 215 of FIG. 2A, based on the rotation of the blade. For example, the air flowing into the inside of the inlet 371 through the opening 350 in the PCB 250 may flow out of the electronic device 100 through an outlet of the fan 270 (not shown in FIG. 3). For example, the outlet of the fan 270 may face the heat sink 280. For example, the air may flow out of the electronic device 100 from the outlet of the fan 270 through the outlet 216. The path of air will be illustrated through FIG. 4.

For example, the first IC 351 and the second IC 352 in contact with the mesh plate 311 may be located on the air path. For example, since at least a part of the first IC 351 and at least a part of the second IC 352 are exposed through the mesh plate 311 to the air flowing into the inlet 371 along the path, the first IC 351 and the second IC 352 may be cooled by the air contacted through the mesh plate 311 as well as the heat pipe 275. For example, the mesh plate 311 may assist in reducing temperature of the first IC 351 and the second IC 352 through the air.

For example, the processor 353 may control the fan 270. For example, the processor 353 may control the fan 270 to rotate the blade. For example, the processor 353 may control the fan 270 according to an execution state of the electronic device 100. For example, the processor 353 may control the fan 270 according to the temperature inside the electronic device 100, the temperature of the first IC 351, and/or the temperature of the second IC 352. The control of the fan 270 may be illustrated through FIG. 4.

Figure 4:
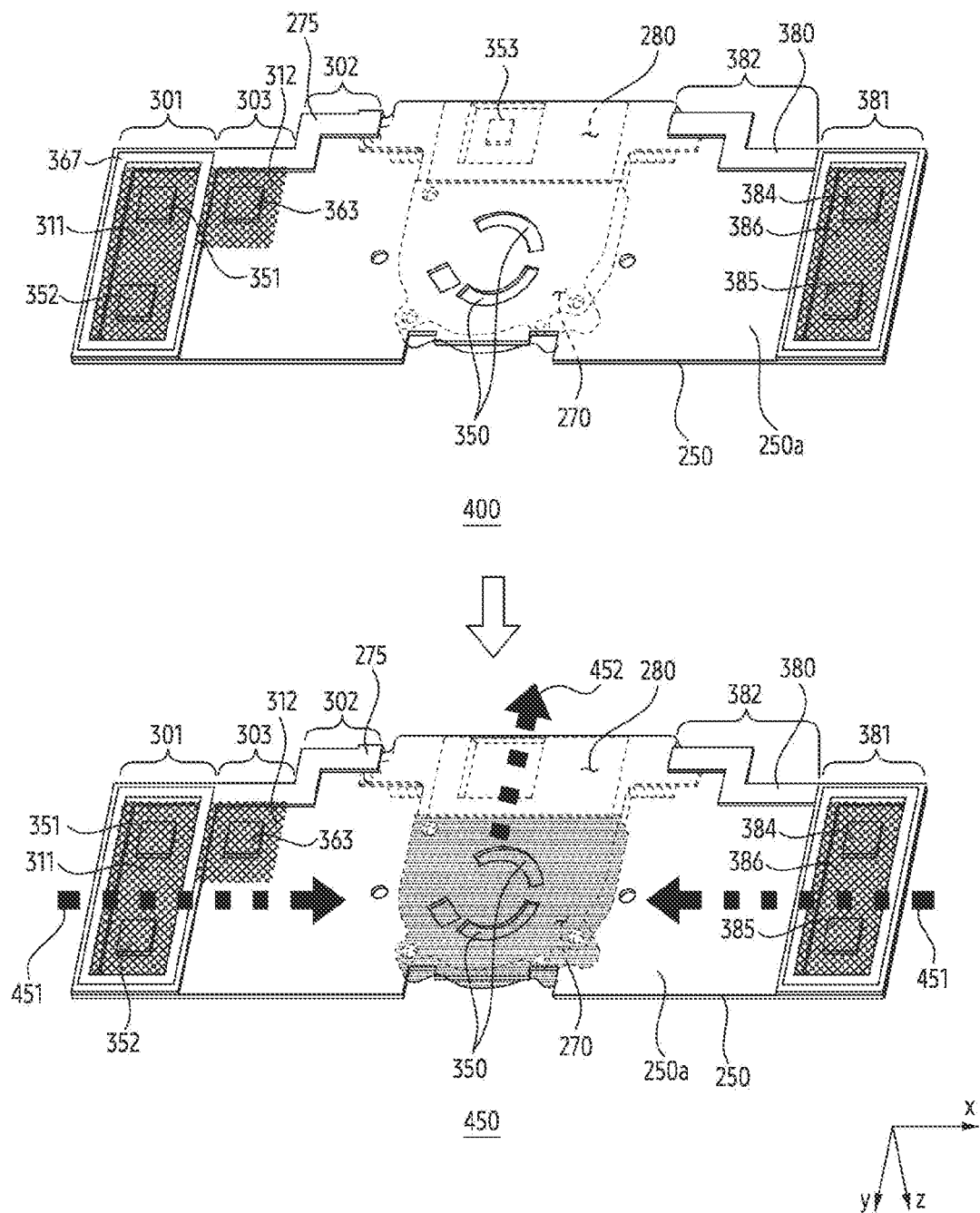
FIG. 4 illustrates an example of controlling a fan in an exemplary electronic device.

FIG. 4 illustrates an example of controlling a fan in an exemplary electronic device.

Referring to FIG. 4, the processor 353 may identify an execution state of the electronic device 100 in relation to temperature inside the electronic device 100.

For example, the processor 353 may identify whether the execution state is a first execution state indicating that the temperature is maintained below reference temperature or a second execution state indicating that the temperature is capable of rising above the reference temperature. For example, the processor 353 may disable the fan 270 as in state 400, based on the first execution state. For example, the processor 353 may enable the fan 270 as in state 450, based on the second execution state. For example, air from outside of the electronic device 100 may flow into inside of the inlet 371 (not shown in FIG. 4) through the opening 350 along the path 451, based on the rotation of the blade according to the enabling of the fan 270. For example, since the air is moved cross over the first IC 351 and second IC 352 according to the rotation of the blade, the first IC 351 and the second IC 352 may be cooled by the enabling of the fan 270. For example, the air moved across over the first IC 351 and the second IC 352 to the inlet 371 (not shown in FIG. 4) may flow out of the outlet of the fan 270. For example, the air may be moved along a path 452.

For example, the second execution state may include a first sub-execution state and a second sub-execution state. For example, the first sub-execution state may indicate that temperature is maintained between the reference temperature and another reference temperature higher than the reference temperature. For example, the second sub-execution state may indicate that the temperature is capable of rising above the other reference temperature. For example, the processor 353 may change rotation speed of the blade according to whether the execution state is the first sub-execution state or the second sub-execution state. For example, the processor 353 may control the fan 270 to rotate the blade in a first rotation speed based on the first sub-execution state. For example, the processor 353 may control the fan 270 to rotate the blade in a second rotation speed higher than the first rotation speed based on the second sub-execution state.

For example, a heat dissipation scheme that reduces temperature of the first IC 351 and/or the second IC 352 based on the first execution state and a heat dissipation scheme that reduces the temperature of the first IC 351 and/or the second IC 352 based on the second execution state including the first sub-execution state and the second sub-execution state may be illustrated as shown in Table 1 below.

TABLE 1

| | First execution state | Second execution state | |
| --- | --- | --- | --- |
| | | First sub-execution state | Second sub-execution state |
| Example | Displaying image that provides VR | Executing game that provides VR | Displaying image of external environment obtained using camera of electronic device 100 (e.g., executing visible see through (VST) mode) |
| heat dissipation scheme | Cooling through heat pipe 275 | Cooling through heat pipe 275 and blade of fan 270 rotating in first rotation speed | Cooling through heat pipe 275 and blade of fan 270 rotating in second rotation speed |

For example, the processor 353 may control the fan 270 based on data indicating the temperature inside the electronic device 100. For example, the data may be identified through at least one temperature sensor included in the electronic device 100. For example, the at least one temperature sensor may be arranged in the electronic device 100 for the first IC 351 and the second IC 352. For example, the processor 353 may disable the fan 270 as in the state 400, based on the data indicating the temperature below the reference temperature. For example, the processor 353 may enable the fan 270 as in the state 450, based on the data indicating the temperature above the reference temperature. For example, when the other reference temperature is configured or set in the electronic device 100, the processor 353 may control the fan 270 to rotate the blade in the first rotation speed based on the data indicating the temperature greater than or equal to the reference temperature and less than the other reference temperature, and control the fan 270 to rotate the blade in the second rotation speed based on the data indicating the temperature greater than or equal to the other reference temperature.

Referring back to FIG. 3, the first IC 351 and the second IC 352 may be connected to the mesh plate 311 through another member or another plate. The other plate may be illustrated in FIG. 5.

Figure 5:
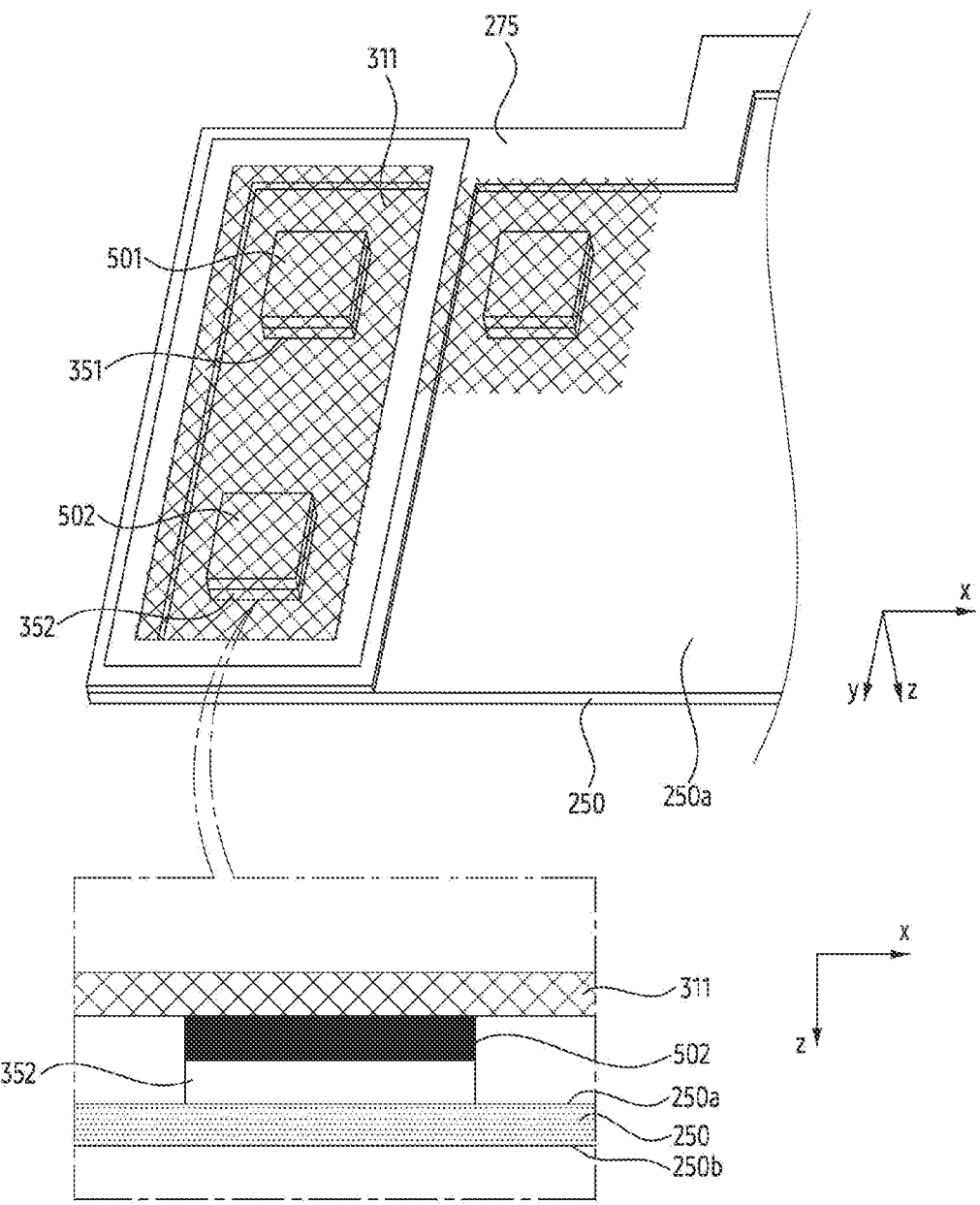
FIG. 5 illustrates an example of an interposed metal plate between an IC on a PCB and a mesh plate.

FIG. 5 illustrates an example of an interposed metal plate between an IC on a PCB and a mesh plate.

Referring to FIG. 5, a first metal plate 501 may be interposed between the first IC 351 and the mesh plate 311. For example, the first metal plate 501 may be located on the first IC 351, and the mesh plate 311 may be located on the first metal plate 501. For example, a direction from the first metal plate 501 to the first IC 351 and a direction from the first metal plate 501 to the mesh plate 311 may correspond to the −z axis direction. For example, the first metal plate 501 and the first IC 351 may be connected through another member. For example, a thermal conductive member may be interposed between the first metal plate 501 and the first IC 351. For example, the first metal plate 501 and the mesh plate 311 may be connected through the other member. For example, a thermal conductive member may be interposed between the first metal plate 501 and the mesh plate 311. For example, the second metal plate 502 may be interposed between the second IC 352 and the mesh plate 311. For example, the second metal plate 502 may be located on the second IC 352, and the mesh plate 311 may be located on the second metal plate 502. For example, the second metal plate 502 and the second IC 352 may be connected through another member. For example, a thermal conductive member may be interposed between the second metal plate 502 and the second IC 352. For example, the second metal plate 502 and the mesh plate 311 may be connected through another member. For example, a thermal conductive member may be interposed between the second metal plate 502 and the mesh plate 311.

For example, an area in which the first metal plate 501 is contacted on the first IC 351 may be larger than an area in which the mesh plate 311 is directly contacted on the first IC 351. For example, the first metal plate 501 may be interposed between the first IC 351 and the mesh plate 311 to increase heat conductivity from the first IC 351. However, it is not limited thereto.

For example, an area in which the second metal plate 502 is contacted on the second IC 352 may be larger than an area in which the mesh plate 311 is directly contacted on the second IC 352 without the second metal plate 502, as shown in FIG. 3. For example, the second metal plate 502 may be interposed between the second IC 352 and the mesh plate 311 to increase the heat conductivity from the second IC 352. However, it is not limited thereto.

Referring back to FIG. 3, the third IC 363 among the plurality of ICs may be located on the first surface 250a of the PCB 250. For example, the third IC 363 may be spaced apart from the first IC 351 and the second IC 352. For example, the third IC 363 may be closer to the processor 353 than the first IC 351 and the second IC 352. For example, the third IC 363 may be included in the electronic device 100 for power provided to the processor 353. However, it is not limited thereto.

For example, the third IC 363 may be located outside a closed loop formed by the first portion 301, surrounding the first IC 351 and the second IC 352. For example, the third IC 363 may be connected to the third portion 303 between the first portion 301 and the second portion 302.

For example, when the third IC 363 is spaced apart from the third portion 303 (or heat pipe 275), the third IC 363 may be connected with another mesh plate 312. For example, the third IC 363 may be connected with the third portion 303 through the other mesh plate 312. For example, the other mesh plate 312 may be contacted on the third IC 363.

For example, the other mesh plate 312 in contact on the third IC 363 may be located on or in a path of air to the inlet 371 (e.g., the path 451 of FIG. 4) when the blade rotates.

For example, the third IC 363 may be located in the closed loop formed by the first portion 301. The third IC 363 located in the closed loop together with the first IC 351 and the second IC 352 may be illustrated through FIGS. 6 and 7.

Figure 6:
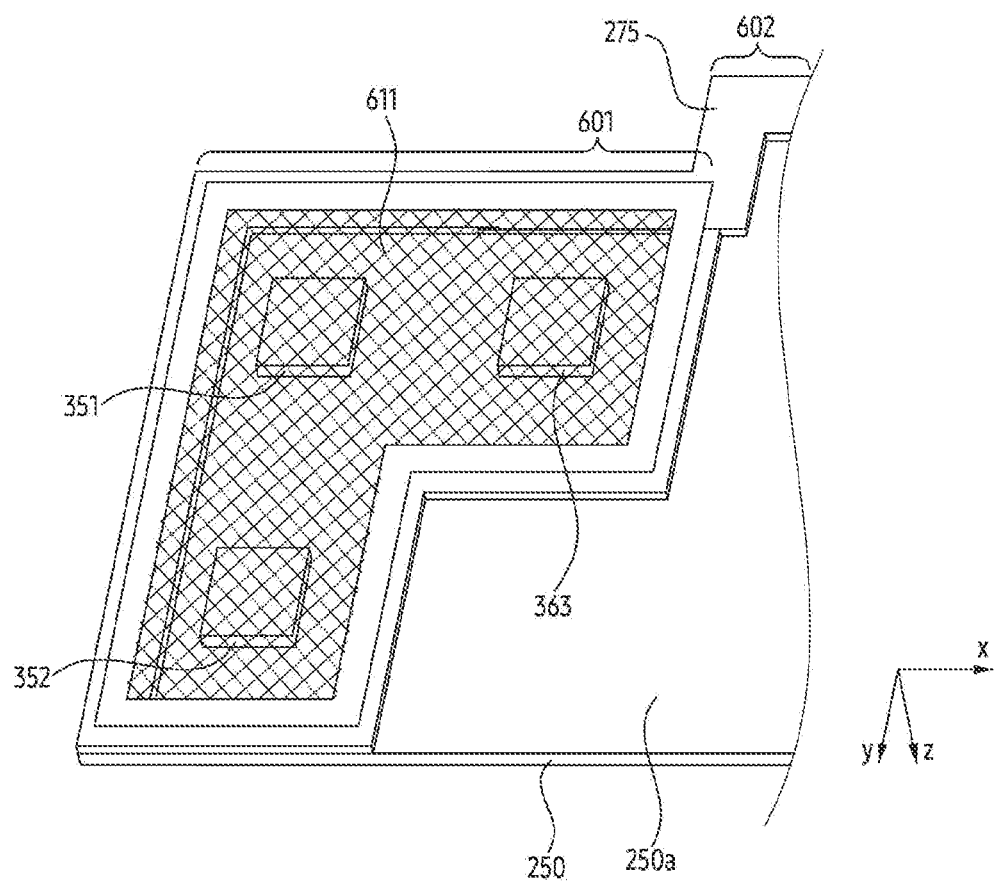
FIGS. 6 and 7 illustrate an example of a heat pipe including a portion surrounding a first IC, a second IC, and a third IC.
Figure 7:
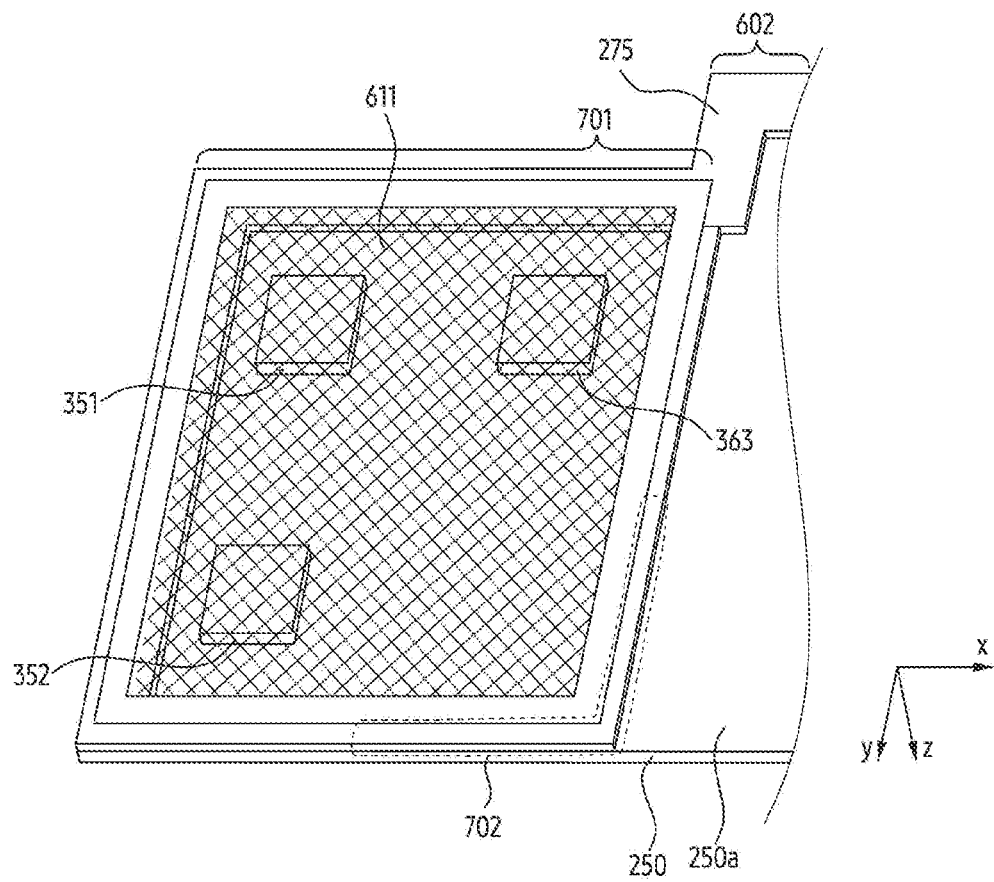

FIGS. 6 and 7 illustrate an example of a heat pipe including a portion surrounding a first IC, a second IC, and a third IC.

Referring to FIG. 6, when viewing the first surface 250a in the second direction (e.g., the +z axis direction), the heat pipe 275 may include a first portion 601 surrounding the first IC 351, the second IC 352, and the third IC 363. For example, the first portion 601 may be connected to each of the first IC 351, the second IC 352, and the third IC 363. For example, the heat pipe 275 may include a second portion 602 extending from the first portion 601 to the heat sink 280 (not shown in FIG. 6).

For example, since the first portion 601 forms a closed loop wider than the closed loop formed by the first portion 301 of FIG. 3, the first portion 601 may provide enhanced cooling performance than the first portion 301. However, it is not limited thereto.

For example, each of the first IC 351, the second IC 352, and the third IC 363 may be connected to the first portion 601 through a mesh plate 611. For example, the mesh plate 611 may be in contact with each of the first IC 351, the second IC 352, and the third IC 363 spaced apart from the first portion 601.

For example, a shape of the first portion 601 surrounding the first IC 351, the second IC 352, and the third IC 363 may be replaced with another shape. For example, referring to FIG. 7, the heat pipe 275 may include a first portion 701 having a shape distinct from the shape of the first portion 601 and a second portion 602 extending from the first portion 701 to the heat sink 280 (not shown in FIG. 6). For example, since the first portion 701 forms a closed loop wider than the closed loop formed by the first portion 601 of FIG. 6 and includes an area 702 spaced apart from the first IC 351, the second IC 352, and the third IC 363, the first portion 701 may provide enhanced performance than the first portion 601. However, it is not limited thereto.

Referring back to FIG. 3, the PCB 250 may include a first area 391, a second area 392 spaced apart from the first area 391, and a third area 393 between the first area 391 and the second area 392, extending from the first area 391 to the second area 392. For example, the first IC 351 and the second IC 352 may be disposed on the first area 391 of the first surface 250a. For example, the processor 353 may be disposed on the third area 393 of the second surface 250b.

For example, among the plurality of ICs, a fourth IC 384 spaced apart from the first IC 351 and the second IC 352, and the fifth IC 385 spaced apart from the first IC 351, the second IC 352, and the fourth IC 384 may be disposed on the second area 392 of the first surface 250a. For example, another heat pipe 380 connected to the heat sink 280 may include a fourth portion 381 on the first surface 250a surrounding the fourth IC 384 and the fifth IC 385 when viewing the first surface 250a in the second direction (e.g., the +z axis direction). For example, the other heat pipe 380 may include a fifth portion 382 extending from the fourth portion 381 to the heat sink 280.

For example, the fourth portion 381 may be connected to the fourth IC 384 and fifth IC 385 spaced apart from the fourth portion 381 through a mesh plate 386. For example, the mesh plate 386 may partially contacted on the fourth IC 384 and the fifth IC 385. For example, when the blade rotates, the mesh plate 386 may be located on or within a path of air to the inlet 371 (e.g., the path 451 of FIG. 4).

Although not illustrated in FIG. 3, a memory (e.g., a memory 930 of FIG. 9) interlocked to the processor 353 may be located on the second surface 250b. For example, the heat sink 280 may be partially contacted on the memory (e.g., the memory 930 of FIG. 9). For example, the processor 353 and the memory (e.g., the memory 930 of FIG. 9) may be located within the area 251 of the second surface 250b of FIG. 2B. However, it is not limited thereto.

For example, the mesh plate 311 may be replaced with a plurality of mesh plates spaced apart from each other. The plurality of mesh plates may be illustrated in FIG. 8.

Figure 8:
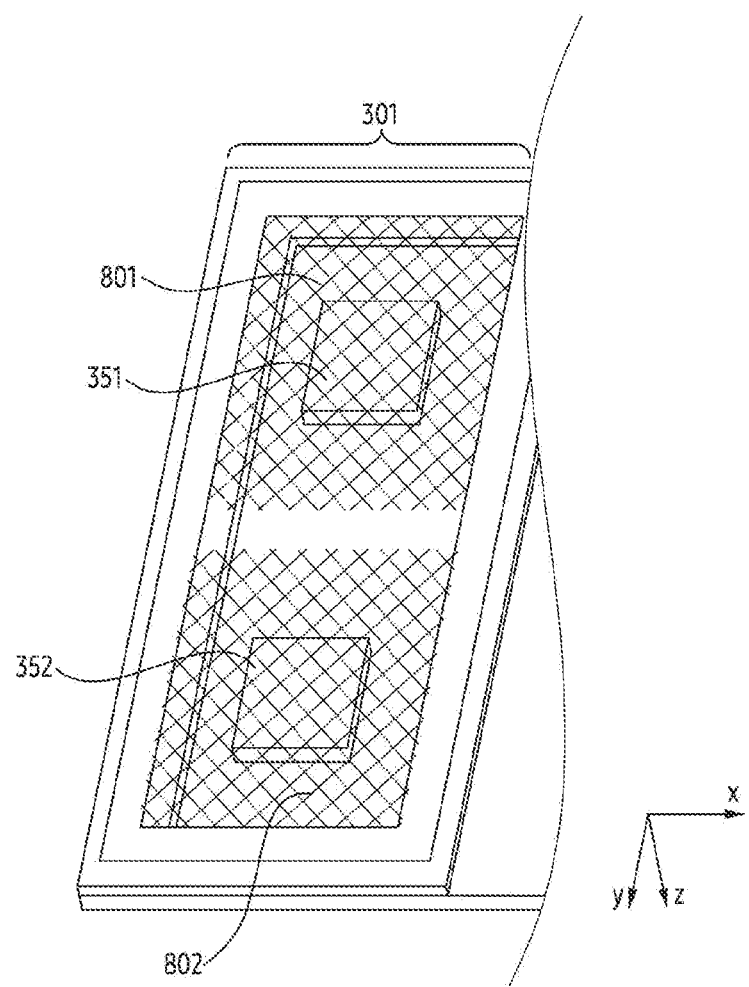
FIG. 8 illustrates an example of a plurality of mesh plates spaced apart from each other.

FIG. 8 illustrates an example of a plurality of mesh plates spaced apart from each other.

Referring to FIG. 8, the mesh plate 311 may be replaced with a first mesh plate 801 and a second mesh plate 802 spaced apart from the first mesh plate 801. For example, the first mesh plate 801 may be contacted on the first IC 351 spaced apart from the first portion 301. For example, the first IC 351 may be connected with the first portion 301 through the first mesh plate 801. For example, the second mesh plate 802 may be contacted on the second IC 352 spaced apart from the first portion 301. For example, the second IC 352 may be connected with the first portion 301 through the second mesh plate 802.

The above examples describe that the electronic device 100 is a wearable device on the part of the body of the user 110, but this is for convenience of explanation. The electronic device 100 may be a portable device such as a smartphone, a tablet, or a laptop computer. For example, the electronic device 100 may include an electronic device 901 or an electronic device 902 illustrated in the following description.

Figure 9:
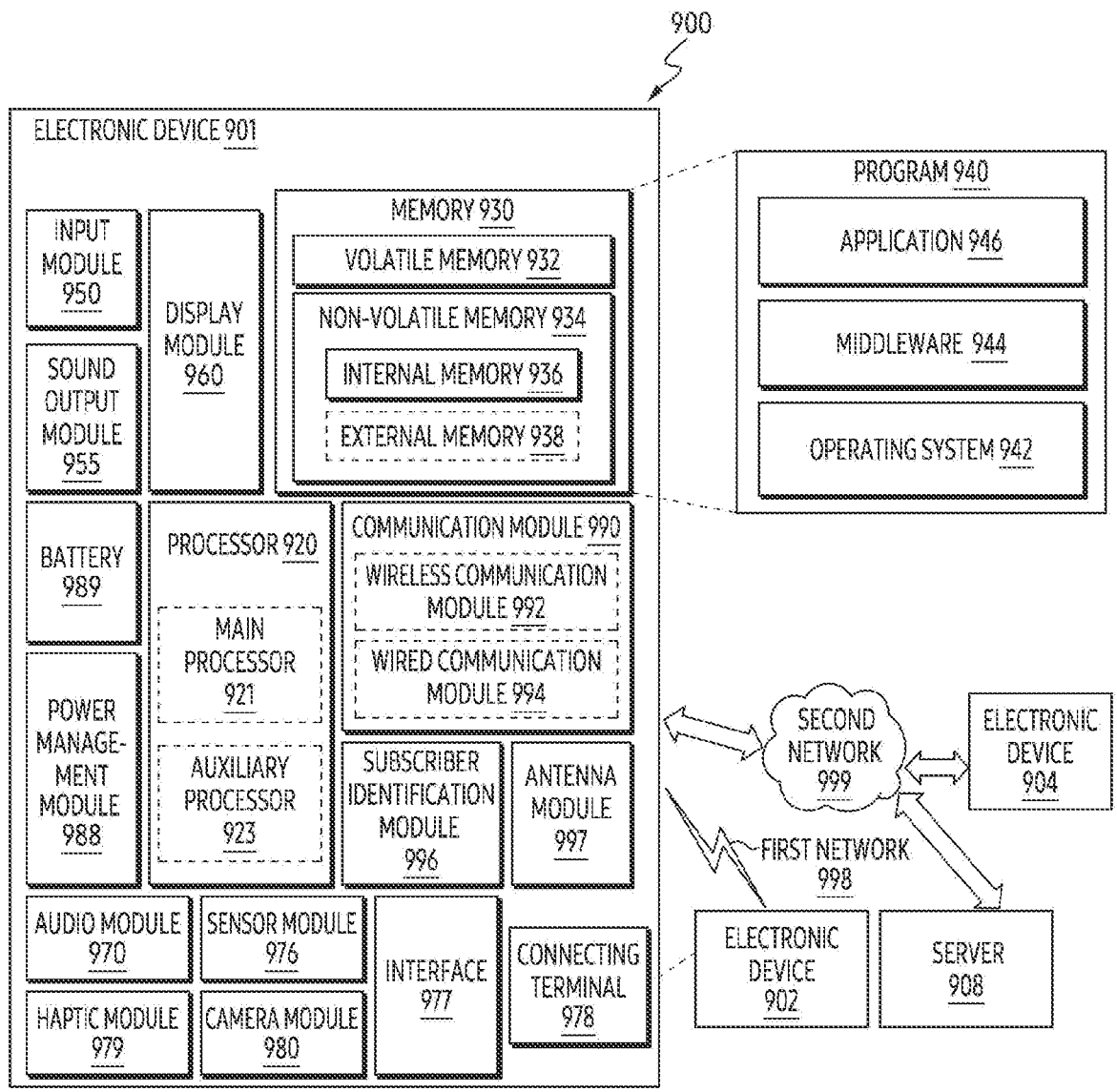
FIG. 9 is a block diagram of an electronic device in a network environment according to various embodiments.

FIG. 9 is a block diagram illustrating an electronic device 901 in a network environment 900 according to various embodiments. Referring to FIG. 9, the electronic device 901 in the network environment 900 may communicate with an electronic device 902 via a first network 998 (e.g., a short-range wireless communication network), or at least one of an electronic device 904 or a server 908 via a second network 999 (e.g., a long-range wireless communication network). According to an embodiment, the electronic device 901 may communicate with the electronic device 904 via the server 908. According to an embodiment, the electronic device 901 may include a processor 920, memory 930, an input module 950, a sound output module 955, a display module 960, an audio module 970, a sensor module 976, an interface 977, a connecting terminal 978, a haptic module 979, a camera module 980, a power management module 988, a battery 989, a communication module 990, a subscriber identification module (SIM) 996, or an antenna module 997. In some embodiments, at least one of the components (e.g., the connecting terminal 978) may be omitted from the electronic device 901, or one or more other components may be added in the electronic device 901. In some embodiments, some of the components (e.g., the sensor module 976, the camera module 980, or the antenna module 997) may be implemented as a single component (e.g., the display module 960).

The processor 920 may execute, for example, software (e.g., a program 940) to control at least one other component (e.g., a hardware or software component) of the electronic device 901 coupled with the processor 920, and may perform various data processing or computation. According to one embodiment, as at least part of the data processing or computation, the processor 920 may store a command or data received from another component (e.g., the sensor module 976 or the communication module 990) in volatile memory 932, process the command or the data stored in the volatile memory 932, and store resulting data in non-volatile memory 934. According to an embodiment, the processor 920 may include a main processor 921 (e.g., a central processing unit (CPU) or an application processor (AP)), or an auxiliary processor 923 (e.g., a graphics processing unit (GPU), a neural processing unit (NPU), an image signal processor (ISP), a sensor hub processor, or a communication processor (CP)) that is operable independently from, or in conjunction with, the main processor 921. For example, when the electronic device 901 includes the main processor 921 and the auxiliary processor 923, the auxiliary processor 923 may be adapted to consume less power than the main processor 921, or to be specific to a specified function. The auxiliary processor 923 may be implemented as separate from, or as part of the main processor 921.

The auxiliary processor 923 may control at least some of functions or states related to at least one component (e.g., the display module 960, the sensor module 976, or the communication module 990) among the components of the electronic device 901, instead of the main processor 921 while the main processor 921 is in an inactive (e.g., sleep) state, or together with the main processor 921 while the main processor 921 is in an active state (e.g., executing an application). According to an embodiment, the auxiliary processor 923 (e.g., an image signal processor or a communication processor) may be implemented as part of another component (e.g., the camera module 980 or the communication module 990) functionally related to the auxiliary processor 923. According to an embodiment, the auxiliary processor 923 (e.g., the neural processing unit) may include a hardware structure specified for artificial intelligence model processing. An artificial intelligence model may be generated by machine learning. Such learning may be performed, e.g., by the electronic device 901 where the artificial intelligence is performed or via a separate server (e.g., the server 908). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 930 may store various data used by at least one component (e.g., the processor 920 or the sensor module 976) of the electronic device 901. The various data may include, for example, software (e.g., the program 940) and input data or output data for a command related thereto. The memory 930 may include the volatile memory 932 or the non-volatile memory 934.

The program 940 may be stored in the memory 930 as software, and may include, for example, an operating system (OS) 942, middleware 944, or an application 946.

The input module 950 may receive a command or data to be used by another component (e.g., the processor 920) of the electronic device 901, from the outside (e.g., a user) of the electronic device 901. The input module 950 may include, for example, a microphone, a mouse, a keyboard, a key (e.g., a button), or a digital pen (e.g., a stylus pen).

The sound output module 955 may output sound signals to the outside of the electronic device 901. The sound output module 955 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 960 may visually provide information to the outside (e.g., a user) of the electronic device 901.

The display module 960 may include, for example, a display, a hologram device, or a projector and control circuitry to control a corresponding one of the display, hologram device, and projector. According to an embodiment, the display module 960 may include a touch sensor adapted to detect a touch, or a pressure sensor adapted to measure the intensity of force incurred by the touch.

The audio module 970 may convert a sound into an electrical signal and vice versa. According to an embodiment, the audio module 970 may obtain the sound via the input module 950, or output the sound via the sound output module 955 or a headphone of an external electronic device (e.g., an electronic device 902) directly (e.g., wiredly) or wirelessly coupled with the electronic device 901.

The sensor module 976 may detect an operational state (e.g., power or temperature) of the electronic device 901 or an environmental state (e.g., a state of a user) external to the electronic device 901, and then generate an electrical signal or data value corresponding to the detected state. According to an embodiment, the sensor module 976 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 977 may support one or more specified protocols to be used for the electronic device 901 to be coupled with the external electronic device (e.g., the electronic device 902) directly (e.g., wiredly) or wirelessly. According to an embodiment, the interface 977 may include, for example, a high definition multimedia interface (HDMI), a universal serial bus (USB) interface, a secure digital (SD) card interface, or an audio interface.

A connecting terminal 978 may include a connector via which the electronic device 901 may be physically connected with the external electronic device (e.g., the electronic device 902). According to an embodiment, the connecting terminal 978 may include, for example, a HDMI connector, a USB connector, an SD card connector, or an audio connector (e.g., a headphone connector).

The haptic module 979 may convert an electrical signal into a mechanical stimulus (e.g., a vibration or a movement) or electrical stimulus which may be recognized by a user via his tactile sensation or kinesthetic sensation. According to an embodiment, the haptic module 979 may include, for example, a motor, a piezoelectric element, or an electric stimulator.

The camera module 980 may capture a still image or moving images. According to an embodiment, the camera module 980 may include one or more lenses, image sensors, image signal processors, or flashes.

The power management module 988 may manage power supplied to the electronic device 901. According to one embodiment, the power management module 988 may be implemented as at least part of, for example, a power management integrated circuit (PMIC).

The battery 989 may supply power to at least one component of the electronic device 901. According to an embodiment, the battery 989 may include, for example, a primary cell which is not rechargeable, a secondary cell which is rechargeable, or a fuel cell.

The communication module 990 may support establishing a direct (e.g., wired) communication channel or a wireless communication channel between the electronic device 901 and the external electronic device (e.g., the electronic device 902, the electronic device 904, or the server 908) and performing communication via the established communication channel. The communication module 990 may include one or more communication processors that are operable independently from the processor 920 (e.g., the application processor (AP)) and supports a direct (e.g., wired) communication or a wireless communication. According to an embodiment, the communication module 990 may include a wireless communication module 992 (e.g., a cellular communication module, a short-range wireless communication module, or a global navigation satellite system (GNSS) communication module) or a wired communication module 994 (e.g., a local area network (LAN) communication module or a power line communication (PLC) module). A corresponding one of these communication modules may communicate with the external electronic device via the first network 998 (e.g., a short-range communication network, such as Bluetooth™ wireless-fidelity (Wi-Fi) direct, or infrared data association (IrDA)) or the second network 999 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 992 may identify and authenticate the electronic device 901 in a communication network, such as the first network 998 or the second network 999, using subscriber information (e.g., international mobile subscriber identity (IMSI)) stored in the subscriber identification module 996.

The wireless communication module 992 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 992 may support a high-frequency band (e.g., the millimeter wave (mmWave) band) to achieve, e.g., a high data transmission rate. The wireless communication module 992 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 992 may support various requirements specified in the electronic device 901, an external electronic device (e.g., the electronic device 904), or a network system (e.g., the second network 999). According to an embodiment, the wireless communication module 992 may support a peak data rate (e.g., 20 gigabits per second (Gbps) or more) for implementing eMBB, loss coverage (e.g., 964 dB or less) for implementing mMTC, or U-plane latency (e.g., 0.5 ms or less for each of downlink (DL) and uplink (UL), or a round trip of 9 ms or less) for implementing URLLC.

The antenna module 997 may transmit or receive a signal or power to or from the outside (e.g., the external electronic device) of the electronic device 901. According to an embodiment, the antenna module 997 may include an antenna including a radiating element composed of a conductive material or a conductive pattern formed in or on a substrate (e.g., a printed circuit board (PCB)). According to an embodiment, the antenna module 997 may include a plurality of antennas (e.g., array antennas). In such a case, at least one antenna appropriate for a communication scheme used in the communication network, such as the first network 998 or the second network 999, may be selected, for example, by the communication module 990 (e.g., the wireless communication module 992) from the plurality of antennas. The signal or the power may then be transmitted or received between the communication module 990 and the external electronic device via the selected at least one antenna. According to an embodiment, another component (e.g., a radio frequency integrated circuit (RFIC)) other than the radiating element may be additionally formed as part of the antenna module 997.

According to various embodiments, the antenna module 997 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 901 and the external electronic device 904 via the server 908 coupled with the second network 999. Each of the electronic devices 902 or 904 may be a device of a same type as, or a different type, from the electronic device 901. According to an embodiment, all or some of operations to be executed at the electronic device 901 may be executed at one or more of the external electronic devices 902 or 904, or the server 908. For example, if the electronic device 901 should perform a function or a service automatically, or in response to a request from a user or another device, the electronic device 901, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 901. The electronic device 901 may provide the outcome, with or without further processing of the outcome, as at least part of a reply to the request. To that end, a cloud computing, distributed computing, mobile edge computing (MEC), or client-server computing technology may be used, for example. The electronic device 901 may provide ultra low-latency services using, e.g., distributed computing or mobile edge computing. In another embodiment, the external electronic device 904 may include an internet-of-things (IoT) device. The server 908 may be an intelligent server using machine learning and/or a neural network. According to an embodiment, the external electronic device 904 or the server 908 may be included in the second network 999. The electronic device 901 may be applied to intelligent services (e.g., smart home, smart city, smart car, or healthcare) based on 5G communication technology or IoT-related technology.

As described above, an electronic device 100 may comprise a printed circuit board (PCB) 250 comprising a first surface 250a and a second surface 250b opposite to the first surface 250a. The electronic device 100 may comprise a processor 353 on the second surface 250b. The electronic device 100 may comprise a heat sink 280 on the second surface 250b, partially contacted on the processor 353. The electronic device 100 may comprise a first integrated circuit (IC) 351 on the first surface 250a. The electronic device 100 may comprise a second IC 352 on the first surface 250a spaced apart from the first IC 351. The electronic device 100 may comprise a heat pipe 275 comprising a first portion 301 on the first surface 250a, connected to each of the first IC 351 and the second IC 352, surrounding the first IC 351 and the second IC 352 when viewing the first surface 250a in a second direction opposite to a first direction that the first surface 250a faces and a second portion 302 extended from the first portion 301 to the heat sink 280.

According to an embodiment, the electronic device 100 may comprise a mesh plate 311 respectively located on the first IC 351 spaced apart from the first portion 301 and the second IC 352 spaced apart from the first portion 301. According to an embodiment, each of the first IC 351 and the second IC 352 may be connected with the first portion 301 through the mesh plate 311.

According to an embodiment, the electronic device 100 may comprise a fan 270 on the second surface comprising an inlet 371, a blade, and an outlet. According to an embodiment, the PCB 250 may comprise an opening 350 corresponding to the inlet 371. According to an embodiment, the fan 270 may be configured to cause air from outside of the electronic device 100 that flows into the inlet 371 through the opening 350 to flow out through the outlet, when the blade is rotated. According to an embodiment, the first IC 351 and the second IC 352 on which the mesh plate 311 is contacted may be located in a path of the air from outside of the electronic device 100 to the inlet 371.

According to an embodiment, the outlet may face the heat sink 280 partially contacted on the processor 353.

According to an embodiment, the processor 353 may be configured to disable the fan 270, based on an execution state of the electronic device 100 indicating that a temperature inside the electronic device 100 is maintained below a reference temperature. According to an embodiment, the processor 353 may be configured to enable the fan 270, based on the execution state indicating that the temperature is capable of rising above the reference temperature.

According to an embodiment, the processor 353 may be configured to control the enabled fan 270 to rotate the blade in a first rotation speed, based on the execution state indicating that the temperature is maintained between the reference temperature and another reference temperature higher than the reference temperature. According to an embodiment, the processor 353 may be configured to control the enabled fan 270 to rotate the blade in a second rotation speed higher than the first rotation speed, based on the execution state indicating that the temperature is capable of rising above the other reference temperature.

According to an embodiment, the processor 353 may be configured to disable the fan 270, based on a temperature inside the electronic device being less than reference temperature. According to an embodiment, the processor 353 may be configured to enable the fan 270, based on the temperature being greater than or equal to the reference temperature.

According to an embodiment, the processor 353 may be configured to control the enabled fan 270 to rotate the blade in a first rotation speed, based on the temperature being greater than or equal to the reference temperature and being less than another reference temperature higher than the reference temperature. According to an embodiment, the processor 353 may be configured to control the enabled fan 270 to rotate the blade in second rotation speed higher than the first rotation speed, based on the temperature being greater than or equal to the other reference temperature.

According to an embodiment, the electronic device 100 may comprise a first metal plate 501 interposed between portion of the mesh plate 311 on the first IC 351 and the first IC 351. According to an embodiment, the electronic device 100 may comprise a second metal plate 502 interposed between another portion of the mesh plate 311 on the second IC 352 and the second IC 352.

According to an embodiment, the electronic device 100 may comprise a memory on the second surface 250b spaced apart from the processor 353. According to an embodiment, the heat sink 280 may be partially contacted on the memory.

According to an embodiment, the electronic device 100 may comprise at least one display 240, disposed on the first surface 250a, located in front of eyes of a user when the electronic device 100 is worn on a part of the body of the user. According to an embodiment, the electronic device 100 may comprise a rechargeable battery. According to an embodiment, the first IC 351 may comprise an IC for power provided to the at least one display 240. According to an embodiment, the second IC 352 may comprise an IC for charge of the rechargeable battery.

According to an embodiment, the electronic device 100 may comprise a third IC 363 on the first surface 250a, spaced apart from the processor 353, the first IC 351, and the second IC 352, for power provided to the processor 353. According to an embodiment, the heat pipe 275 may comprise the first portion 601 connected to each of the first IC 351, the second IC 352, and the third IC 363, surrounding the first IC 351, the second IC 352, and the third IC 363 when viewing the first surface 250a in the second direction.

According to an embodiment, the electronic device 100 may comprise a mesh plate 611 contacted on each of the first IC 351 spaced apart from the first portion 301, the second IC 352 spaced apart from the first portion 301, and the third IC 363 spaced apart from the first portion 301. According to an embodiment, each of the first IC 351, the second IC 352, and the third IC 363 may be connected with the first portion 601 through the mesh plate 611.

According to an embodiment, the electronic device 100 may comprise a first mesh plate contacted on each of the first IC 351 spaced apart from the first portion and the second IC 352 spaced apart from the first portion. According to an embodiment, the electronic device 100 may comprise a second mesh plate contacted on the third IC 363 spaced apart from the first portion. According to an embodiment, each of the first IC 351 and the second IC 352 may be connected with the first portion through the first mesh plate. According to an embodiment, the third IC 363 may be connected with the first portion through the second mesh plate.

According to an embodiment, the electronic device 100 may comprise a third IC 363 on the first surface, spaced part from the first IC and the second IC, for power provided to the processor. According to an embodiment, the third IC 363 may be located outside of a closed loop formed by the first portion 301 surrounding the first IC 351 and the second IC 352 and may be connected to a third portion 303 of the heat pipe 275 between the first portion 301 and the second portion 302.

According to an embodiment, the electronic device 100 may comprise another mesh plate 312 contacted on the third IC 363 spaced apart from the third portion 303. According to an embodiment, the third IC 363 may be connected with the third portion 303 through the other mesh plate 312.

According to an embodiment, the electronic device 100 may comprise at least one display 240 that is disposed on the first surface 250a, is located in front of eyes of a user when the electronic device 100 is worn on a part of the body of the user, and comprises a plurality of emitting elements. According to an embodiment, the first IC 351 may comprise an IC for power provided to the at least one display. According to an embodiment, the second IC 352 may comprise an IC for controlling the plurality of emitting elements.

According to an embodiment, the electronic device 100 may comprise a first mesh plate 801 contacted on the first IC 351 spaced apart from the first portion 301. According to an embodiment, the electronic device 100 may comprise a second mesh plate 802 contacted on the second IC 352 spaced apart from the first portion 301. According to an embodiment, the first IC 351 may be connected with the first portion 301 through the first mesh plate 801. According to an embodiment, the second IC 352 may be connected with the first portion 301 through the second mesh plate 802.

According to an embodiment, the electronic device 100 may comprise a third IC 384 on the first surface 250a, spaced apart from the first IC 351 and the second IC 352. According to an embodiment, the electronic device 100 may comprise a fourth IC 385 on the first surface 250a, spaced apart from the first IC 351, the second IC 352, and the third IC 363. According to an embodiment, the electronic device 100 may comprise another heat pipe 380 comprising a fourth portion 381 on the first surface 250a, surrounding the third IC 384 and the fourth IC 385 when viewing the first surface 250a in the second direction, connected to each of the third IC 384 and the fourth IC 385, and a fifth portion 382 extended from the fourth portion 381 to the heat sink 280. According to an embodiment, the PCB 250 may comprise a first area 391, a second area 392 spaced apart from the first area 391, and a third area 393 between the first area 391 and the second area 392 that is extended from the first area 391 to the second area 392. According to an embodiment, the first IC 351 and the second IC 352 may be disposed on the first area 391 of the first surface 250a. According to an embodiment, the processor 353 may be disposed on the third area 393 of the second surface 250b. According to an embodiment, the third IC 384 and the fourth IC 385 may be disposed on the second area 392 of the first surface 250a.

According to an embodiment, the electronic device 100 may comprise a first mesh plate 311 contacted on each of the first IC 351 spaced apart from the first portion 301 and the second IC 352 spaced apart from the first portion 301. According to an embodiment, the electronic device 100 may comprise a second mesh plate 386 contacted on each of the third IC 384 spaced apart from the fourth portion 381 and the fourth IC 385 spaced apart from the fourth portion 381. According to an embodiment, the electronic device 100 may comprise a fan 270 on the third area 393 of the second surface 250b comprising an inlet 371, a blade, and an outlet. According to an embodiment, the PCB 250 may comprise an opening 350 at least partially overlapping the inlet 371. According to an embodiment, the fan 270 may be configured to cause air from outside of the electronic device that flows into the inlet 371 through the opening 350 to flow out through the outlet, when the blade is rotated. According to an embodiment, the first IC 351 on which the first mesh plate 311 is contacted, the second IC 352 on which the first mesh plate 311 is contacted, the third IC 384 on which the second mesh plate 386 is contacted, and the fourth IC 385 on which the second mesh plate 386 is contacted may be located on a path of the air from outside of the electronic device 100 to the inlet 371.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 940) including one or more instructions that are stored in a storage medium (e.g., internal memory 936 or external memory 938) that is readable by a machine (e.g., the electronic device 901). For example, a processor (e.g., the processor 920) of the machine (e.g., the electronic device 901) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
    a printed circuit board (PCB) comprising a first surface and a second surface opposite to the first surface;
    a processor disposed on the second surface of the PCB;
    a heat sink disposed on the second surface, at least partially contacted on the processor;
    first integrated circuitry (IC) disposed on the first surface of the PCB;
    second IC disposed on the first surface of the PCB and spaced apart from the first IC; and
    a heat pipe comprising:
        a first portion, disposed on the first surface of the PCB, thermally connected to both the first IC and the second IC, and surrounding both the first IC and the second IC such that both the first IC and the second IC are positioned within a closed loop defined by the first portion of the heat pipe, and
        a second portion extending from the first portion of the heat pipe to the heat sink.

2. The electronic device of claim 1, further comprising:
    a mesh plate disposed over both the first IC and the second IC,
    wherein both the first IC and the second IC are spaced apart from the first portion and are physically connected to the first portion through the mesh plate.

3. The electronic device of claim 2, further comprising:
    a fan on the second surface comprising:
        an inlet,
        a blade, and
        an outlet,
    wherein the PCB comprises an opening corresponding to the inlet, and wherein the fan is configured to cause air from outside of the electronic device that flows into the inlet through the opening to flow out through the outlet, when the blade is rotated, and wherein the first IC and the second IC, with which the mesh plate is in contact, are disposed in a path of the air from outside of the electronic device to the inlet.

4. The electronic device of claim 3, wherein the outlet faces the heat sink at least partially contacted on the processor.

5. The electronic device of claim 3, further comprising:
memory, comprising one or more storage media storing instructions, wherein the processor comprises processing circuitry, wherein the instructions, when executed by the processor, cause the electronic device to:
disable the fan, based on an execution state of the electronic device indicating that a temperature inside the electronic device is maintained below a reference temperature, and
enable the fan, based on the execution state indicating that the temperature is capable of rising above the reference temperature.

6. The electronic device of claim 5, wherein the instructions, when executed by the processor, further cause the electronic device to:
control the enabled fan to rotate the blade in a first rotation speed, based on the execution state indicating that the temperature is maintained between the reference temperature and another reference temperature higher than the reference temperature, and
control the enabled fan to rotate the blade in a second rotation speed higher than the first rotation speed, based on the execution state indicating that the temperature is capable of rising above the other reference temperature.

7. The electronic device of claim 3, further comprising:
memory, comprising one or more storage media storing instructions, wherein the processor comprises processing circuitry, wherein the instructions, when executed by the processor, cause the electronic device to:
disable the fan, based on a temperature inside the electronic device being less than reference temperature, and
enable the fan, based on the temperature being greater than or equal to the reference temperature.

8. The electronic device of claim 7, wherein the instructions, when executed by the processor, further cause the electronic device to:
control the enabled fan to rotate the blade in a first rotation speed, based on the temperature being greater than or equal to the reference temperature and being less than another reference temperature higher than the reference temperature, and
control the enabled fan to rotate the blade in a second rotation speed higher than the first rotation speed, based on the temperature being greater than or equal to the other reference temperature.

9. The electronic device of claim 2, further comprising:
a first metal plate interposed between the first IC and a portion of the mesh plate disposed on the first IC; and
a second metal plate interposed between the second IC and another portion of the mesh plate disposed on the second IC.

10. The electronic device of claim 1, further comprising:
a memory disposed on the second surface of the PCB and spaced apart from the processor, wherein the heat sink is at least partially contacted on the memory.

11. The electronic device of claim 1, further comprising:
at least one display, disposed on the first surface of the PCB and located in front of eyes of a user when the electronic device is worn on a part of a body of the user; and
a rechargeable battery, wherein the first IC comprises IC for power provided to the at least one display, and wherein the second IC comprises IC for charge of the rechargeable battery.

12. The electronic device of claim 1, further comprising:
third IC disposed on the first surface of the PCB, spaced apart from the processor, the first IC, and the second IC, and configured to provide power to the processor, wherein the first portion is thermally connected to each of the first IC, the second IC, and the third IC, and surrounds each of the first IC, the second IC, and the third IC such that each of the first IC, the second IC, and the third IC is positioned within the closed loop defined by the first portion of the heat pipe.

13. The electronic device of claim 12, further comprising:
a mesh plate disposed over each of the first IC, the second IC, and the third IC, wherein each of the first IC, the second IC, and the third IC is spaced apart from the first portion of the heat pipe and is physically connected to the first portion through the mesh plate.

14. The electronic device of claim 12, further comprising:
a first mesh plate disposed over both the first IC and the second IC; and
a second mesh plate disposed over the third IC, wherein both the first IC and the second IC are spaced apart from the first portion of the heat pipe and are physically connected to the first portion through the first mesh plate, and wherein the third IC is spaced apart from the first portion of the heat pipe and is physically connected to the first portion through the second mesh plate.

15. The electronic device of claim 1, further comprising:
third IC disposed on the first surface of the PCB, spaced part from the first IC and the second IC, and configured to provide power to the processor, wherein the third IC is located outside of the closed loop defined by the first portion of the heat pipe and is connected to a third portion of the heat pipe between the first portion and the second portion.

16. The electronic device of claim 15, further comprising:
another mesh plate contacted on the third IC spaced apart from the third portion, wherein the third IC is spaced apart from the third portion of the heat pipe and is physically connected to the third portion through the other mesh plate.

17. The electronic device of claim 1, further comprising:
at least one display that is disposed on the first surface of the PCB, is located in front of eyes of a user when the electronic device is worn on a part of a body of the user, and comprises a plurality of emitting elements, wherein the first IC comprises IC for power provided to the at least one display, and wherein the second IC comprises IC for controlling the emitting elements.

18. The electronic device of claim 1, further comprising:
a first mesh plate disposed over the first IC; and
a second mesh plate disposed over the second IC, wherein the first IC is spaced apart from the first portion and is physically connected to the first portion through the first mesh plate, and wherein the second IC is spaced apart from the first portion and is physically connected to the first portion through the second mesh plate.

19. The electronic device of claim 1, further comprising:

third IC disposed on the first surface of the PCB, spaced apart from the first IC and the second IC;

fourth IC disposed on the first surface, spaced apart from the first IC, the second IC, and the third IC; and another heat pipe comprising:
  a third portion disposed on the first surface of the PCB, thermally connected to both the third IC and the fourth IC, and surrounding both the third IC and the fourth IC such that both the third IC and the fourth IC are positioned within a closed loop defined by the third portion of the other heat pipe, and
  a fourth portion extending from the third portion to the heat sink, wherein the PCB comprises a first area, a second area spaced apart from the first area, and a third area between the first area and the second area that is extended from the first area to the second area, wherein the first IC and the second IC are disposed on the first area of the first surface, wherein the processor is disposed on the third area of the second surface, and wherein the third IC and the fourth IC are disposed on the second area of the first surface.

20. The electronic device of claim 19, further comprising:

a first mesh plate contacted on each of the first IC spaced apart from the first portion and the second IC spaced apart from the first portion;

a second mesh plate contacted on each of the third IC spaced apart from the third portion and the fourth IC spaced apart from the third portion; and a fan on the third area of the second surface comprising an inlet, a blade, and an outlet, wherein the PCB comprises an opening at least partially overlapping the inlet, wherein the fan is configured to cause air from outside of the electronic device that flows into the inlet through the opening to flow out through the outlet, when the blade is rotated, and wherein the first IC on which the first mesh plate is contacted, the second IC on which the first mesh plate is contacted, the third IC on which the second mesh plate is contacted, and the fourth IC on which the second mesh plate is contacted are located on a path of the air from outside of the electronic device to the inlet.

* * * * *